(12) United States Patent
Weber et al.

(10) Patent No.: US 12,406,304 B2
(45) Date of Patent: *Sep. 2, 2025

(54) SYSTEMS AND METHODS FOR TRADES PRICED RELATIVE TO A REFERENCE BENCHMARK VALUE ASSOCIATED WITH AN UNDERLYING INDEX FUTURE

(71) Applicant: NYSE American LLC, New York, NY (US)

(72) Inventors: Clifford J. Weber, Basking Ridge, NJ (US); Lynn C. Martin, New York, NY (US)

(73) Assignee: NYSE American LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/192,862

(22) Filed: Apr. 29, 2025

(65) Prior Publication Data

US 2025/0259237 A1    Aug. 14, 2025

Related U.S. Application Data

(63) Continuation of application No. 18/824,418, filed on Sep. 4, 2024, now Pat. No. 12,321,988, which is a (Continued)

(51) Int. Cl.
*G06Q 40/04*   (2012.01)
(52) U.S. Cl.
CPC .................. *G06Q 40/04* (2013.01)

(58) Field of Classification Search
CPC ....................................................... G06Q 40/04
See application file for complete search history.

(56) References Cited

U.S. PATENT DOCUMENTS 7,865,426 B2    1/2011   Volpert
8,332,307 B1   12/2012   Gastineau
(Continued)

FOREIGN PATENT DOCUMENTS

| CA | 2679261 A1 * | 9/2008 | ............ G06Q 40/00 |
| WO | 2005024602 A1 | 3/2005 | |
| WO | WO-2010059697 A1 * | 5/2010 | ............ G06Q 40/06 |

OTHER PUBLICATIONS

CME Group: E-mini Stock Index Futures and Options, 2006, pp. 1-27 (Year: 2006).*

(Continued)

*Primary Examiner* — Bijendra K Shrestha
(74) *Attorney, Agent, or Firm* — DLA Piper LLP (US)

(57) ABSTRACT

According to some embodiments, an indication of a trade priced relative to a reference benchmark value (e.g., a trade at index close transaction) associated with an underlying index future may be received when a basis of the trade is agreed to by parties of the trade. Moreover, the indication may be received at least one day prior to a determination of a final price and quantity of the trade. The trade might create, according to some embodiments, any derivative, such as a future, an option, or a combination of put and call options. The trade may be reported and cleared, and it may then be arranged for the trade to physically settle into the underlying index future.

16 Claims, 16 Drawing Sheets

Related U.S. Application Data continuation of application No. 18/437,334, filed on Feb. 9, 2024, now Pat. No. 12,112,379, which is a continuation of application No. 18/357,673, filed on Jul. 24, 2023, now Pat. No. 11,941,699, which is a continuation of application No. 14/542,701, filed on Nov. 17, 2014, now Pat. No. 11,756,118, which is a continuation of application No. 14/212,077, filed on Mar. 14, 2014, now Pat. No. 10,430,879.

(60) Provisional application No. 61/790,782, filed on Mar. 15, 2013.

(56) References Cited

U.S. PATENT DOCUMENTS

| | | | |
|---|---|---|---|
| 8,396,769 B1 | 3/2013 | Selig et al. | |
| 8,712,891 B1 | 4/2014 | Shalen | |
| 2003/0154153 A1 | 8/2003 | Steidlmayer et al. | |
| 2004/0148249 A1 | 7/2004 | Kinnear | |
| 2004/0210502 A1* | 10/2004 | Madhavan | G06Q 40/04 705/36 R |
| 2004/0267567 A1 | 12/2004 | Barrera et al. | |
| 2006/0212384 A1* | 9/2006 | Spurgin | G06Q 40/04 705/37 |
| 2008/0177675 A1 | 7/2008 | Arginteanu | |
| 2010/0082471 A1 | 4/2010 | Hylton | |
| 2010/0125535 A1* | 5/2010 | Nowak | G06Q 40/06 705/36 R |
| 2011/0191234 A1 | 8/2011 | Kiron | |
| 2013/0036039 A1 | 2/2013 | Rohlfs | |
| 2013/0046673 A1 | 2/2013 | Kiron | |
| 2014/0012725 A1 | 1/2014 | Mele et al. | |
| 2014/0122371 A1 | 5/2014 | Sood | |
| 2014/0304134 A1* | 10/2014 | Shalen | G06Q 40/04 705/37 |

OTHER PUBLICATIONS

Hudson et al: Convergence Issues in the Intercontinental Exchange CottonFuture Contracts: Alternatives and Potential Remedies , Aug. 2012, Cotton Economic Reasearch Institute, Texas Tech University, CERI-12-SP01, pp. 1-26 (Year: 2012).*

Wurgler, Jeffrey: On the Economic Consequences of Index-linked Investing, Sep. 2010, National Bureau of Economic Research, pp. 1-(Year: 2010).*

"Model Uncertainty and Its Impact on the Pricing of Derivative Instruments," Rama CONT, Centre de Mathematiques Appliquees, Ecole Polytechnique, Jun. 15, 2006, 34 pages.

Won, Wei Han, "Gold Traders in Asia May Get New Benchmark," The Straits Times; Singapore, Oct. 18, 2016, three (3) pages.

* cited by examiner

| Contract Name | mini MSCI EAFE IC Future 510 | mini MSCI Emerging Markets IC Future 520 |
|---|---|---|
| Underlying | mini MSCI EAFE Index Future (MFS) | mini MSCI EM Index Future (MME) |
| Contract Size | 1 MFS futures contract | 1 MME futures contract |
| Quoting Convention | Quoted as a basis plus 100.00; quoted in index points with $50 multiplier | Quoted as a basis plus 100.00; quoted in index points with $50 multiplier |
| Tick Size (minimum fluctuation) | Outright<br>0.01 index points = $0.50 | Outright<br>0.01 index points = $0.50 |
| Trading Hours<br>All times listed are Eastern Times (ET) | 7:16 PM to 5:00 PM the following day, Sunday through Friday. | |
| Contract Months | Two-day contracts: each day, a new contract will be listed that expires the following day. The underlying future will be the current front month contract. | |
| Last Trade Date/Time | Trading can occur up to 11:00 AM on expiration. | Trading can occur up to 4:15 PM on expiration. |
| Final Settlement Procedure | Physical Settlement. All open positions at the close of the final trading day are settled to a value of 100.00 and creates a position in the underlying futures contract at an EDSP equal to the closing value of the underlying index. | |
| Daily Price Limits | N/A | |
| Position Limits | 50,000 contracts, aggregated with underlying futures contract. | |
| Block Trade Thresholds | 50 contracts | |

*FIG. 5*

| Levels as of | Trade (T) | T Close | T+1 Close | Trade (T) | T Close | T+1 Close |
|---|---|---|---|---|---|---|
| MFS Future | 1408.00 | 1410.00 | 1411.20 | 1408.00 | 1410.00 | 1411.20 |
| Closing Index Value | NA | NA | 1409.13 | NA | NA | 1409.13 |
|  | CURRENT PROCESS | | | FUTURES PROCESS | | |
| Agreed basis | 6.32 | | | 6.32 | 6.21 | 0.00 |
| BIC Futures Trade Price | | | | 106.32 | 106.21 | 100.00 |
| Mark to Market Long | | | | | $ (5.50) | $ (310.50) |
| Long Margin | | | | | $ 3,000.00 | |
| Mark to Market Short | | | | | $ 5.50 | $ 310.50 |
| Short Margin | | | | | $ 3,000.00 | $ - |
| MFS Future Trade Price | | | 1,415.45 | | | 1409.13 |
| Mark to Market Long | | | $ (212.50) | | | $ 103.50 |
| Long Margin | | | $ 3,000.00 | | | $ 3,000.00 |
| Mark to Market Short | | | $ 212.50 | | | $ (103.50) |
| Short Margin | | | $ 3,000.00 | | | $ 3,000.00 |
| NET | | | $ (212.50) | | $ (5.50) | $ (207.00) |
| | | | | | | $ (212.50) |
| * Customer initial margin set at $3,000? | | | | | | |

*FIG. 6*

| | mini MSCI EAFE IC Option 910 | mini MSCI Emerging Markets IC Option 920 |
|---|---|---|
| Contract Name | | |
| Underlying | mini MSCI EAFE Index Future (MFS) | mini MSCI EM Index Future (MME) |
| Contract Size | 1 MFS futures contract | 1 MME futures contract |
| Quoting Convention | Quoted as a basis plus 100.00; quoted in index points with $50 multiplier | Quoted as a basis plus 100.00; quoted in index points with $50 multiplier |
| Strike price | 100.00 calls and puts | 100.00 calls and puts |
| Tick Size (minimum fluctuation) | Outright 0.01 index points = $0.50 | Outright 0.01 index points = $0.50 |
| Trading Hours All times listed are Eastern Times (ET) | 7:16 PM to 5:00 PM the following day, Sunday through Friday. | |
| Contract Months | Two-day contracts: each day, a new contract will be listed that expires the following day. The underlying future will be the current front month contract. | |
| Last Trade Date/Time | Trading can occur up to 11:00 AM on expiration. | Trading can occur up to 4:15 PM on expiration. |
| Final Settlement Procedure | Physical Settlement. All open positions at the close of the final trading day are automatically exercised based on settlement price of 100.00 and creates a position in the underlying futures contract at EDSP equal to the closing value of the underlying index. | |
| Daily Price Limits | N/A | |
| Position Limits | 50,000 contracts, aggregated with underlying futures contract. | |
| Block Trade Thresholds | 50 contracts | |

FIG. 9

| Levels as of | Trade (T) | T Close | T+1 Close | Trade (T) | T Close | T+1 Close | Trade (T) | T Close | T+1 Close |
|---|---|---|---|---|---|---|---|---|---|
| MFS Future | 1408.00 | 1410.00 | 1411.20 | 1408.00 | 1410.00 | 1411.20 | 1408.00 | 1410.00 | 1411.20 |
| Closing Index Value | NA | NA | 1409.13 | NA | NA | 1409.13 | NA | NA | 1409.13 |
| | | CURRENT PROCESS | | | OPTIONS PROCESS (+basis) | | | OPTIONS PROCESS (-basis) | |
| Agreed basis | 6.32 | | | 6.32 | 6.21 | 0.00 | -2.24 | -2.21 | 0.00 |
| | | | | CALL | | | PUT | | |
| BIC Option Trade Price | | | | 6.32 | 6.21 | 0.00 | -2.24 | -2.21 | 0.00 |
| Long premium paid | | | | $ (316.00) | $ - | $ - | | $ 112.00 | $ - |
| Long Margin | | | | * | | | | | |
| Short premium credit | | | | $ 316.00 | $ - | $ - | $ (112.00) | $ - | |
| Short Margin | | | | TBD | | | TBD | | |
| | | | | | | | | | |
| MFS Future Trade Price | | | 1,415.45 | | | 1409.13 | | | 1409.13 |
| Mark to Market Long | | | $ (212.50) | | | $ 103.50 | | | $ 103.50 |
| Long Margin | | | $ 3,000.00 | | | $ 3,000.00 | | | $ 3,000.00 |
| Mark to Market Short | | | $ 212.50 | | | $ (103.50) | | | $ (103.50) |
| Short Margin | | | $ 3,000.00 | | | $ 3,000.00 | | | $ 3,000.00 |
| | | | | | | | | | |
| NET | | | $ (212.50) | | $ (316.00) | $ 103.50 | | $ 112.00 | $ 103.50 |
| | | | | | | $ (212.50) | | | $ 215.50 |

\* Customer initial margin set at $3,000?

FIG. 10

| Contract Name | mini MSCI EAFE IC Futures Option Combo 1310 | mini MSCI Emerging Markets IC Futures Option Combo 1320 |
|---|---|---|
| Underlying | mini MSCI EAFE Index Future (MFS) | mini MSCI EM Index Future (MME) |
| Contract Size | 1 MFS futures contract | 1 MME futures contract |
| Quoting Convention | Long call/short put combination quoted in index points with $50 multiplier | Long call/short put combination quoted in index points with $50 multiplier |
| Strike price | "at-the-money" calls and puts | "at-the-money" calls and puts |
| Tick Size (minimum fluctuation) | 0.01 index points = $0.50 | 0.01 index points = $0.50 |
| Trading Hours All times listed are Eastern Times (ET) | 7:16 PM to 5:00 PM the following day, Sunday through Friday. | |
| Contract Months | Two-day contracts: each day, new calls and puts will be listed that expire the following day. The underlying future will be the current front month contract. | |
| Last Trade Date/Time | Trading can occur up to 11:00 AM on expiration. | Trading can occur up to 4:15 PM on expiration. |
| Final Settlement Procedure | Physical Settlement. All open positions at the close of the final trading day are settled to the closing index value and creates a position in the underlying futures contract at EDSP equal to the closing value of the underlying index. | |
| Daily Price Limits | N/A | |
| Position Limits | 50,000 contracts, aggregated with underlying futures contract. | |
| Block Trade Thresholds | 50 contracts | |

| Levels as of | Trade (T) | T Close | T+1 Close | Trade (T) | T Close | T+1 Close |
|---|---|---|---|---|---|---|
| MFS Future | 1408.00 | 1410.00 | 1411.20 | 1408.00 | 1410.00 | 1411.20 |
| Closing Index Value | NA | NA | 1409.13 | NA | NA | 1409.13 |
| | | CURRENT PROCESS | | | IC OPTION COMBINATION | |
| Agreed basis | 6.32 | | | 6.32 | 6.21 | 0.00 |
| Net price | | | | 6.32 | 6.21 | 0.00 |
| Long premium paid | | | | | $ (316.00) | $ - |
| Long Margin | | | | | | |
| Short premium credit | | | | | $ 316.00 | $ - |
| Short Margin | | | | | TBD | $ - |
| MFS Future Trade Price | | | 1,415.45 | | | 1409.13 |
| Mark to Market Long | | | $ (212.50) | | | $ 103.50 |
| Long Margin | | | $ 3,000.00 | | | $ 3,000.00 |
| Mark to Market Short | | | $ 212.50 | | | $ (103.50) |
| Short Margin | | | $ 3,000.00 | | | $ 3,000.00 |
| NET | | | $ (212.50) | | $ (316.00) | $ 103.50 |
| | | | | | | $ (212.50) |
| * Customer initial margin set at $3,000? | | | | | | |

1410 (columns 2-4), 1420 (columns 5-7)

FIG. 14

SYSTEMS AND METHODS FOR TRADES PRICED RELATIVE TO A REFERENCE BENCHMARK VALUE ASSOCIATED WITH AN UNDERLYING INDEX FUTURE

TECHNICAL FIELD

This disclosure relates generally to the field of electronic trading systems and in particular to facilitating trades priced relative to a reference benchmark value associated with an underlying index future.

BACKGROUND

An exchange may facilitate a customer's ability to invest assets in ways that track the value of an underlying index. For example, a pension fund manager may want to invest assets such that the return on investment will closely track the value of a stock index. Moreover, in some cases an investor might want to avoid directly purchasing the stock shares. One approach is to invest in futures tied to the index (instead of actually purchasing the stocks in the index), which tend to closely track the value of the underlying index. Since 2011, Block Trade at Index Close ("BIC") type trades associated with the NYSE Liffe U.S. have provided customers the ability to manage the tracking impact of executing large orders relative to the underlying index level by explicitly tying the transaction price to the closing level of the underlying index. For example, mini-MSCI Europe, Australia and Far East ("EAFE") and mini MSCI Emerging Markets index futures are associated with a robust, vibrant market having substantial volumes and open interest which have proven to be popular with investors (and have been associated with $14 billion notional on over 500 transactions). Typically, block trades are executed and reported to the exchange when a final price and quantity are determined.

Difficulties can arise however, when an international index future (e.g., the EAFE and emerging market index futures) is associated with multiple time zones. For example, because different markets are opening and closing at different times, the final price and/or quantity of a trade might not be known until one or two days after the parties initiate the trade (e.g., by agreeing to a basis value for the trade). Such a situation can cause problems if trade prices are published and/or settled before the final price is actually known.

It would therefore be desirable to provide automatic and accurate systems and methods to facilitate trades priced relative to a reference benchmark value associated with an underlying index future.

SUMMARY OF THE DISCLOSURE

According to some embodiments, systems, methods, apparatus, computer program code and means may be provided to facilitate trades priced relative to a reference benchmark value associated with an underlying index future. In some embodiments, an indication of a trade priced relative to a reference benchmark value associated with an underlying index future may be received when a basis of the trade is agreed to by parties of the trade. Moreover, the indication may be received at least one day prior to a determination of a final price and quantity of the trade. The trade might create, according to some embodiments, a derivative, such as a future, an option on a future, or a combination of put and call options. The trade may be reported and cleared, and it may then be arranged for the trade to physically settle into the underlying index future. According to some embodiments, an indication of the trade may be transmitted.

Some embodiments provide: means for receiving an indication of a trade priced relative to a reference benchmark value associated with an underlying index future when a basis of the trade is agreed to by parties of the trade at least one day prior to a determination of a final price and quantity of the trade; means for reporting the trade; means for clearing the trade; and means for arranging for the trade to physically settle into the underlying index future.

A technical effect of some embodiments of the disclosure is an improved and computerized method of executing trades priced relative to a reference benchmark value associated with an underlying index future. With these and other advantages and features that will become hereinafter apparent, a more complete understanding of the nature of the disclosure can be obtained by referring to the following detailed description and to the drawings appended hereto.

BRIEF DESCRIPTION OF THE DRAWINGS

FIG. 5 is an example of potential trade at index close specifications in accordance with some embodiments.

FIG. 6 illustrates a margin analysis for a trade at index close future according to some embodiments.

FIG. 9 is an example of potential trade at index close options specifications in accordance with some embodiments.

FIG. 10 illustrates a margin analysis for a trade at index close option according to some embodiments.

FIG. 13 is an example of potential trade at index close combination of put and call options specifications in accordance with some embodiments.

FIG. 14 illustrates a margin analysis for a trade at index close combination of put and call options according to some embodiments.

DETAILED DESCRIPTION

An exchange may facilitate a customer's ability to invest assets in ways that track the value of an underlying index.

For example, a pension fund manager may want to invest assets such that the return on investment will closely track the value of a stock index. Moreover, in some cases an investor might want to avoid directly purchasing the stock shares. One approach is to invest in futures tied to the index (instead of actually purchasing the stocks in the index), which tend to closely track the value of the underlying index. Typically, block trades are executed and reported to the exchange when a final price and quantity are determined.

Difficulties can arise however, when an international index future is associated with multiple time zones. For example, because different markets are opening and closing at different times, the final price and/or quantity of a trade might not be known until one or two days after the parties initiate the trade (e.g., by agreeing to a basis value for the trade). Such a situation can cause problems if trade prices are published and/or settled before the final price is actually known.

Figure 1:
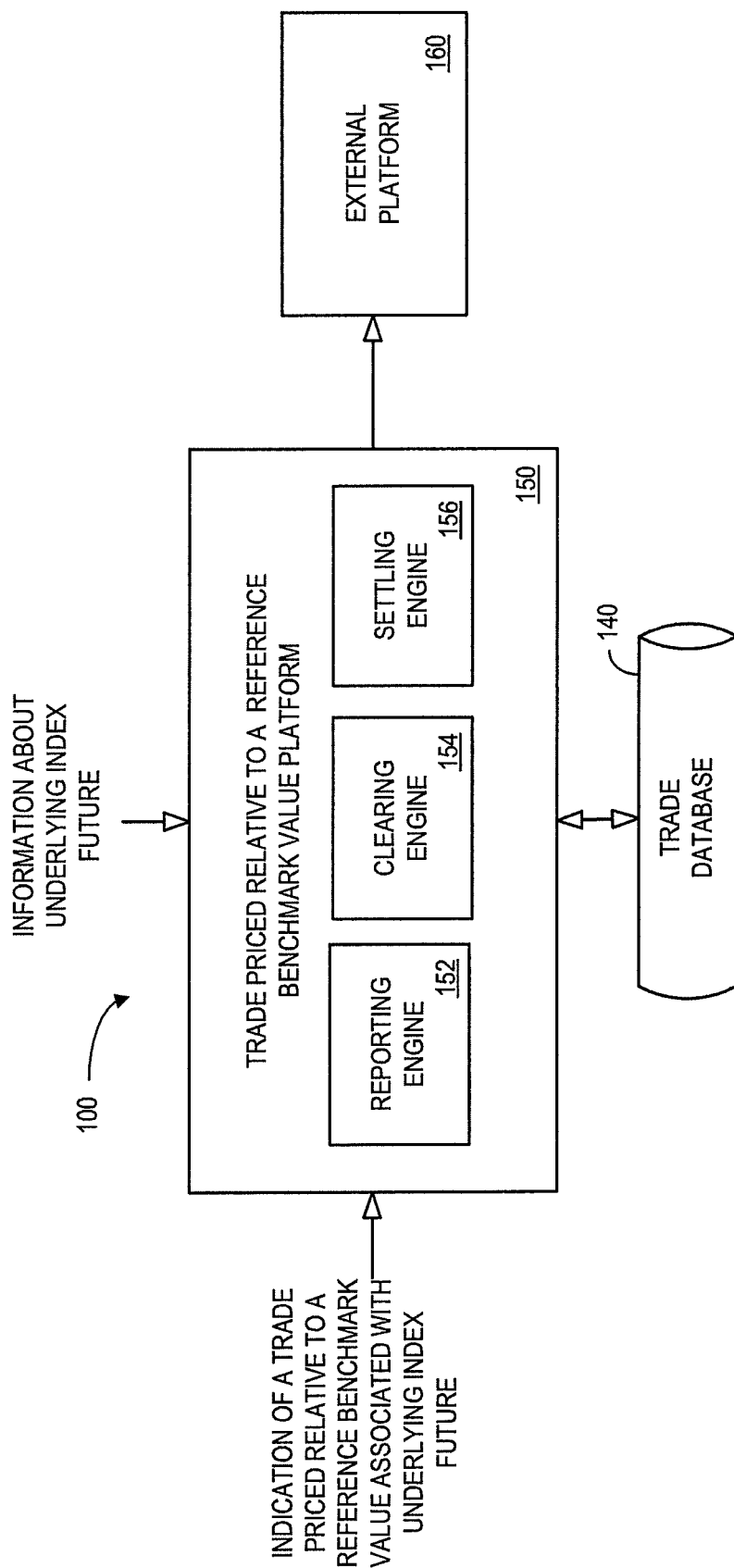
FIG. 1 is block diagram of a system according to some embodiments of the present disclosure.

It would therefore be desirable to provide automatic and accurate systems and methods to facilitate trades priced relative to a reference benchmark value associated with an underlying index future. To facilitate such goals, FIG. 1 is block diagram of a system 100 according to some embodiments of the present disclosure. In particular, the system 100 includes a trade priced relative to a reference benchmark value platform 150 that receives an indication of a selected benchmark to be referenced in the future. The trade priced relative to a reference benchmark value platform 150 might be, for example, associated with a Personal Computer ("PC"), laptop computer, an enterprise server, a server farm, and/or a database or similar storage devices. The trade priced relative to a reference benchmark value platform 150 may, according to some embodiments, be associated with a financial institution or exchange.

According to some embodiments, an "automated" trade priced relative to a reference benchmark value platform 150 may facilitate trading index future instruments. As used herein, the term "automated" may refer to, for example, actions that can be performed with little or no human intervention.

As used herein, devices, including those associated with the trade priced relative to a reference benchmark value platform 150 and any other device described herein, may exchange information via any communication network which may be one or more of a Local Area Network (LAN), a Metropolitan Area Network (MAN), a Wide Area Network (WAN), a proprietary network, a financial information network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

The trade priced relative to a reference benchmark value platform 150 may also access a trade database 140. The trade database 140 might be operated, for example, by a government agency or a news service. The trade database 140 may be locally stored or reside remote from the trade priced relative to a reference benchmark value platform 150. As will be described further herein, the trade database 140 may be used by the trade priced relative to a reference benchmark value platform 150 to help facilitate trading index future instruments.

Although a single trade priced relative to a reference benchmark value platform 150 is shown in FIG. 1, any number of such devices may be included. Moreover, various devices described herein might be combined according to embodiments of the present disclosure. For example, in some embodiments, the trade priced relative to a reference benchmark value platform 150 and the trade database 140 might be co-located and/or may comprise a single apparatus. According to some embodiments, the trades priced relative to a reference benchmark value platform 150 receives trade information (e.g., from an administrator or from another device) and provides information to an external platform 160 (which might be associated with, for example, a pension fund manager). Moreover, the trade priced relative to a reference benchmark value platform 150 may automatically and directly output data to one or more external systems, such as report generators, email servers, workflow applications, etc.

Figure 2:
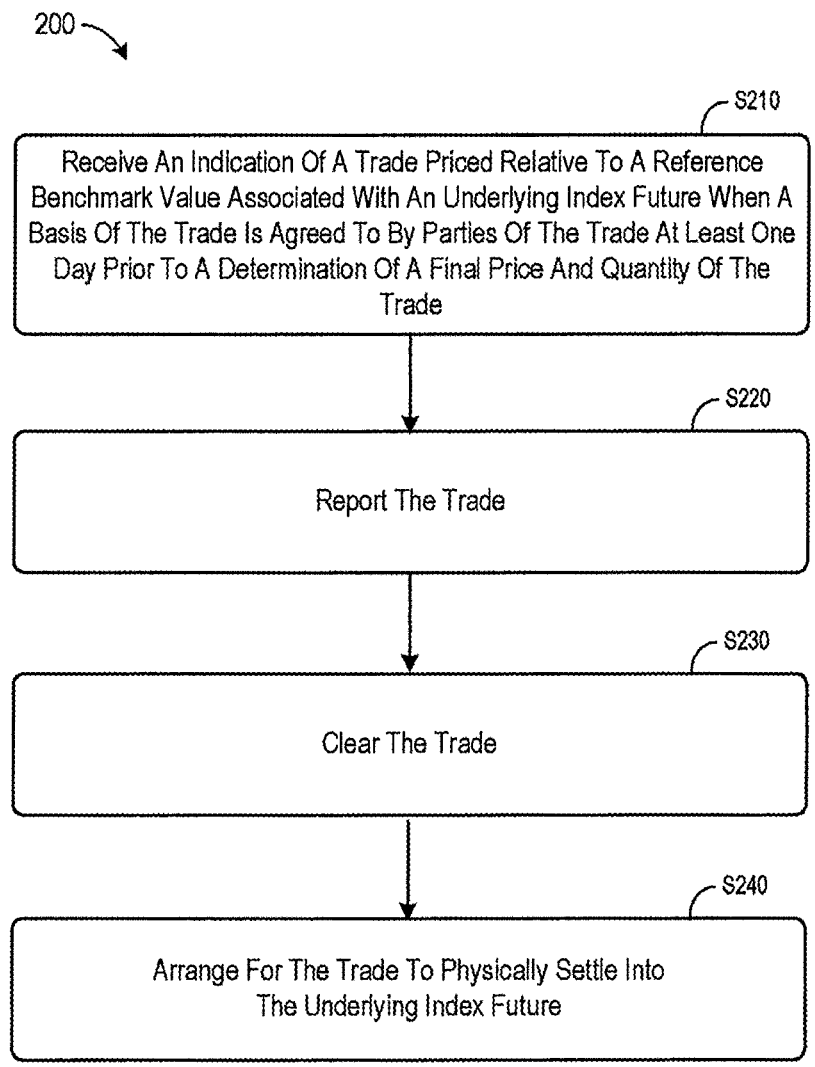
FIG. 2 illustrates a method according to some embodiments of the present disclosure.

FIG. 2 illustrates a method that might be performed, for example, by some or all of the elements of the system 100 described with respect to FIG. 1 according to some embodiments of the present disclosure. The flow charts described herein do not imply a fixed order to the steps, and embodiments of the present disclosure may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, an indication of a trade priced relative to a "reference benchmark value associated with an underlying index future may be received when a basis of the transaction is agreed to by parties of the transaction prior to a determination of a final price and quantity of the trade. As used herein, the phrase "reference benchmark value" may be associated with, for example, an index close, an index open, an exchange daily settlement price, and a volume weighted average price over time. Moreover the basis of the trade may be agreed to by parties of the trade at least one day prior to the determination of the final price and quantity of the trade.

At S220, the trade may be reported. At S230, the trade may be cleared. At S240, it may be arranged for the trade to physically settle into the underlying index future. As will be described, embodiments of the present disclosure might be associated with any trade priced relative to a reference benchmark value derivatives approach, including a trade priced relative to a reference benchmark value futures approach, options approach, and/or a combination of put and call options approach. Moreover, the derivative created by the trade may be listed on a central order book and/or be available for block trading. Further note that some embodiments may be associated with a mini-MSCI "EAFE" (Europe, Australasia and Far East) index future and/or a mini-MSCI Emerging Markets ("EM") index future.

Some embodiments described herein use "futures" to facilitate block trades priced relative to a reference benchmark value associated with an underlying index future. That is, a future-on-a-future may be utilized. As used herein, the term "future" may refer to, for example, an agreement between two parties to buy or sell a specified asset for a price agreed upon today (the futures price or strike price) with delivery and payment occurring at a specified future date.

Figure 3:
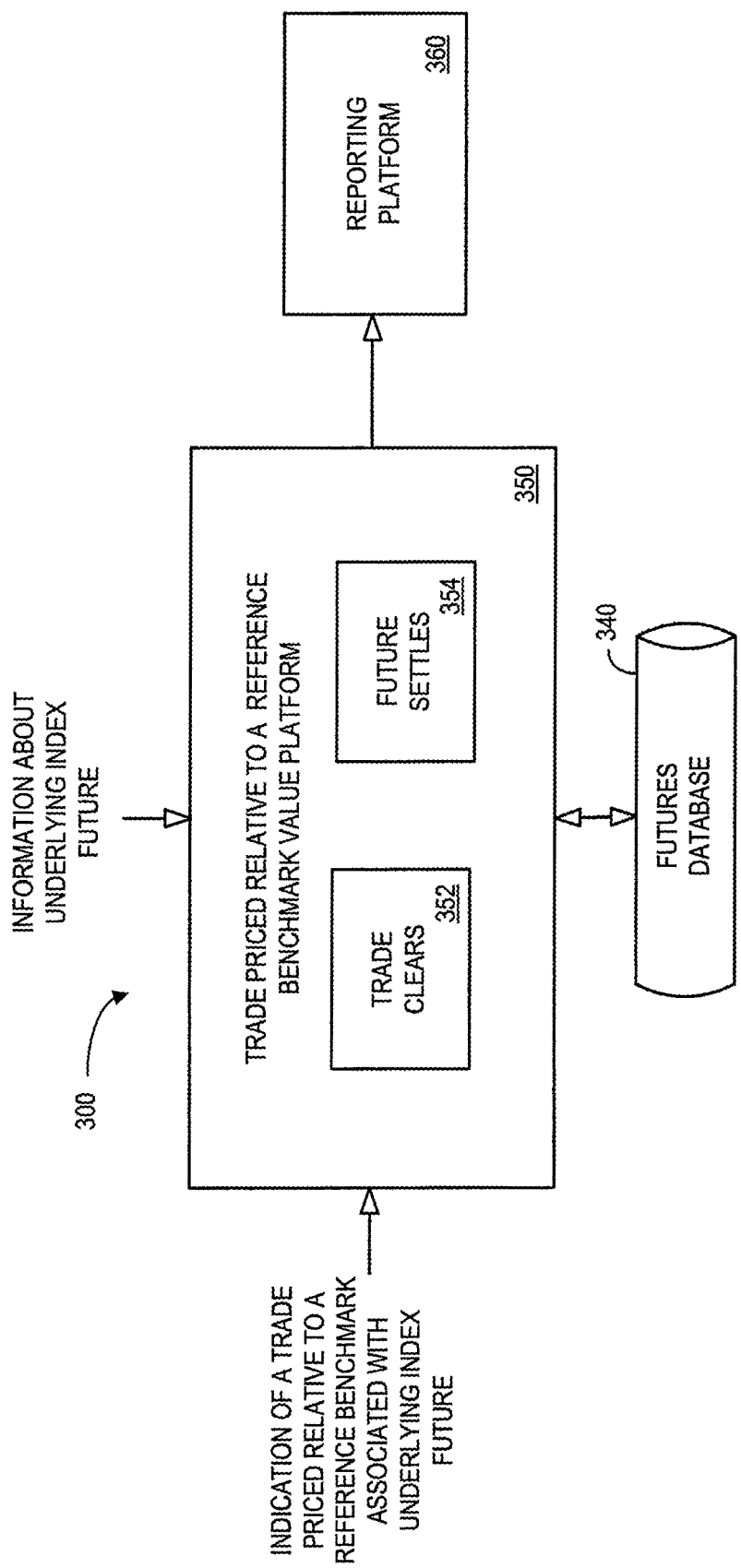
FIG. 3 is an example of a trades priced relative to a reference benchmark value futures system in accordance with some embodiments.
Figure 4:
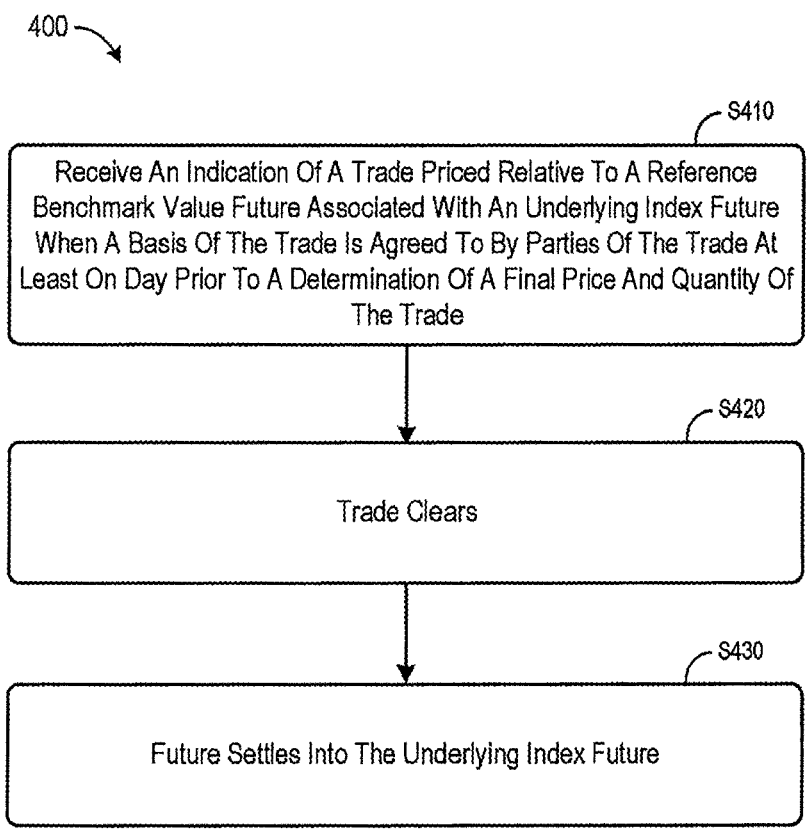
FIG. 4 is a diagram of a trades priced relative to a reference benchmark value futures method according to some embodiments of the present disclosure.

FIG. 3 is an example of a trades priced relative to a reference benchmark value futures system 300 in accordance with some embodiments. As in FIG. 1, a trade priced relative to a reference benchmark value platform 350 may receive an indication of a trade priced relative to a reference benchmark value associated with an underlying index future. According to this embodiment, after the trade clears 352, the future settles 354 and information about the trade may be stored in a futures database 340 and/or be transmitted to a reporting platform 360. FIG. 4 is a diagram of a trades priced relative to a reference benchmark value futures method 400 according to some embodiments of the present disclosure. At S410, an indication of a trade priced relative to a at reference benchmark value associated with an underlying index future may be received when a basis of the transaction is agreed to by parties of the transaction at least one day prior to a determination of a final price and quantity of the trade. At S420, the trade may clear and the future may settle into the underlying index future at S430. FIG. 5 is an example of potential trade at index close futures specifications 500 for both a mini-MSCI EAFE IC future 510 and a mini-MSCI Emerging Markets IC future 520 in accordance with some embodiments. Although the example of FIG. 5 is associated with a trade at index close, note that other types of trades priced relative to reference benchmark values may be used instead.

Consider, for example, a mini-MSCI EAFE trade at index close future example. On Monday at 3:30 PM New York time, a buyer and seller trade 141 EAFE IC futures at 106.32 (implying a basis of 6.32 and notional value of $316 per contract). The trade clears and settles at a basis of 6.32. According to some embodiments, the trade is marked to market at the closing basis settlement value. The next day's official closing index level of 1,409.13 is available at 2:00 PM New York time on Tuesday. On Tuesday evening, the EAFE IC future may settle to a value of 100 and creates a position in 141 mini MSCI EAFE futures (ticker "MFS") having an Exchange Delivery Settlement Price ("EDSP") of 1,409.13.

As another example, consider a mini-MSCI EM trade at index close future transaction. On Monday at 1:30 PM New York time, a buyer and a seller trade 334 EM IC futures at 97.74 (implying a basis of −2.26 and notional value of −$203 per contract). The trade clears and settles at a basis of −2.26. The trade is marked to market at closing basis settlement value. The next day's official closing index level of 900.11 is available at 6:30 PM NY time on Tuesday. On Tuesday evening, the EM IC future settles to a value of 100 and creates a position in 334 mini-MSCI EM futures (MME) at ED SP of 900.11.

FIG. 6 illustrates a margin analysis 600 for a trade at index close future according to some embodiments. The analysis 600 compares an existing trade at index close process 610 with a trade at index close futures process 620. In the example of FIG. 6, on day "T" it is agreed that a basis of +6.32 will be established for a trade against the next day's index close in EAFE. Moreover, on day T+1, the index closes at 1409.13 (implying a trade price of 1,415.45). As can be seen, the existing process 610 is associated with a single transaction on day T+1 while the futures process 620 has transactions on both day T and day T+1.

FIGS. 3 through 6 describe the use of a future to facilitate trades priced relative to a reference benchmark value associated with an underlying index future. According to other embodiments, other types of derivatives may be used instead. For example, "options" may be used to facilitate trades priced relative to a reference benchmark value associated with an underlying index future. That is, an option-on-a-future may be utilized. As used herein, the term "option" may refer to, for example, an agreement which gives an owner the right, but not the obligation, to buy or sell an underlying asset or instrument at a specified strike price on or before a specified date.

Figure 7:
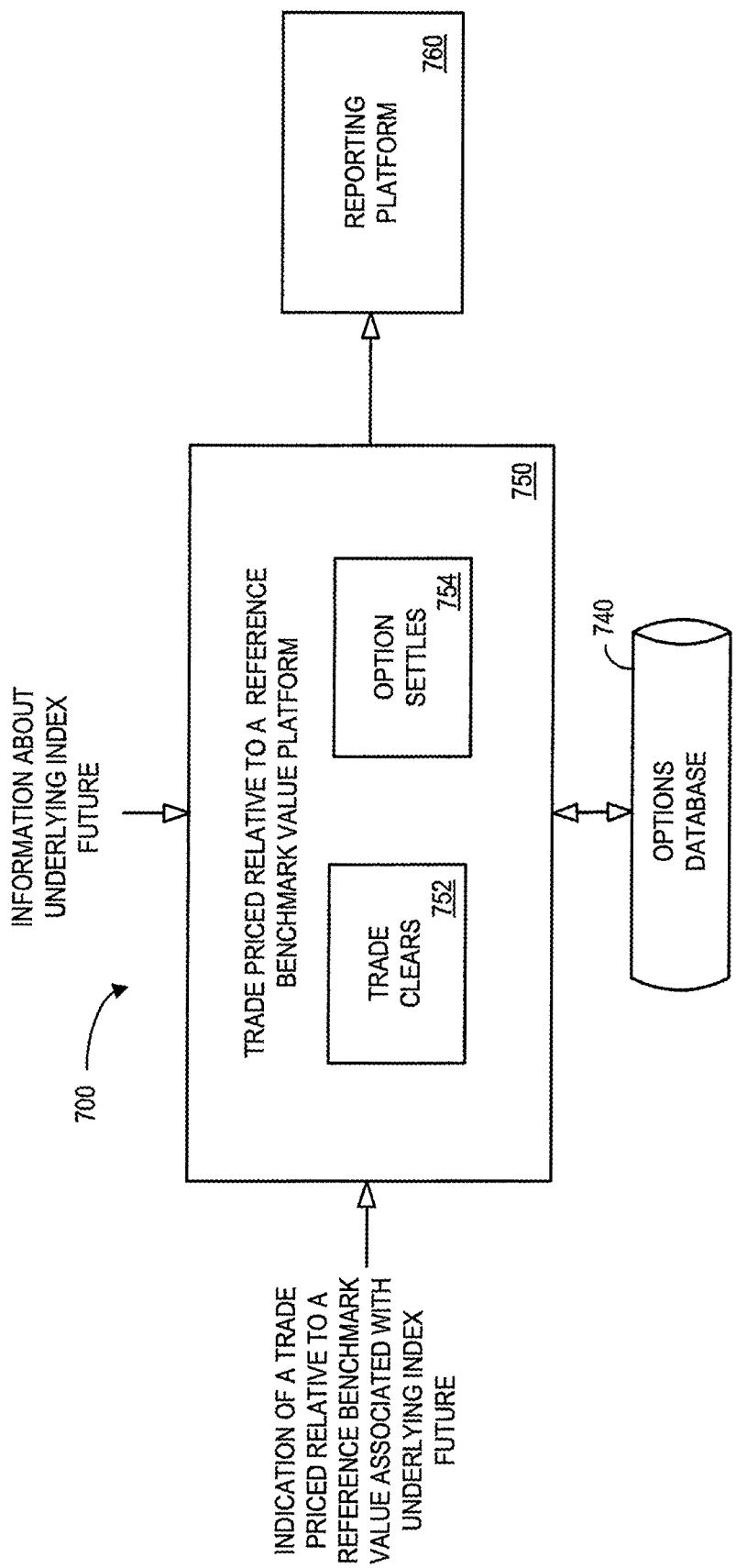
FIG. 7 is an example of a trades priced relative to a reference benchmark value options system in accordance with some embodiments.
Figure 8:
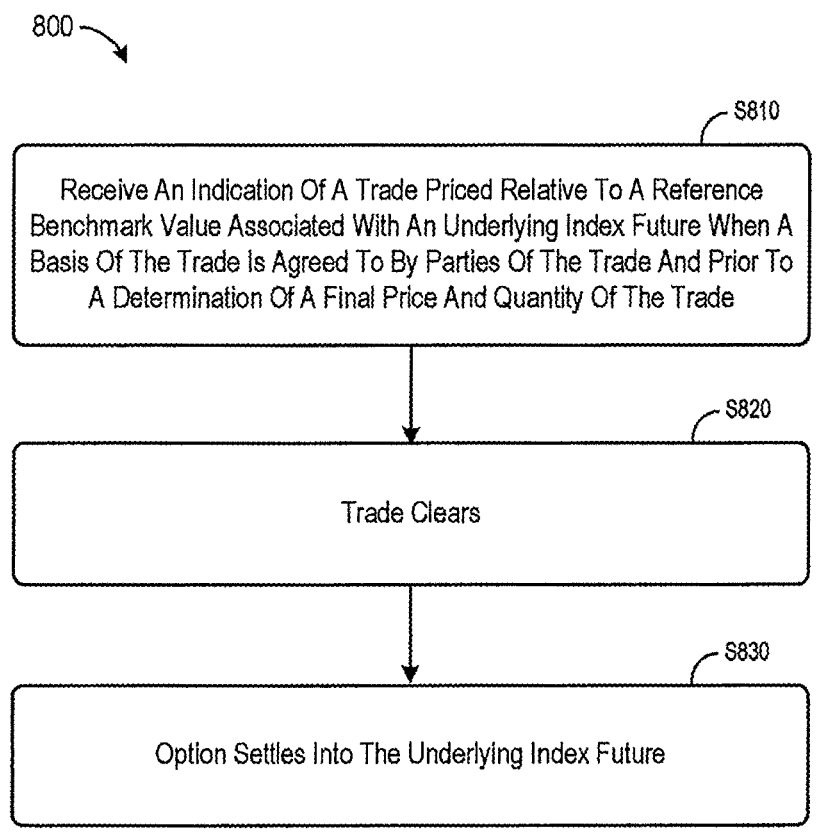
FIG. 8 is a diagram of a trades priced relative to a reference benchmark value options method according to some embodiments of the present disclosure.

FIG. 7 is an example of a trades priced relative to a reference benchmark value options system 700 in accordance with some embodiments. As in FIG. 1, a trade priced relative to a reference benchmark value platform 750 may receive an indication of a trade priced relative to a reference benchmark value associated with an underlying index future. According to this embodiment, after the trade clears 752, an option settles 754 and information about the trade may be stored in an options database 740 and/or be transmitted to a reporting platform 760. FIG. 8 is a diagram of a trades priced relative to a reference benchmark value options method 800 according to some embodiments of the present disclosure. At S810, an indication of a trades priced relative to a reference benchmark value associated with an underlying index future may be received when a basis of the transaction is agreed to by parties of the trade at least one day prior to a determination of a final price and quantity of the trade. At S820, the trade may clear and an option may settle into the underlying index future at S830. FIG. 9 is an example of potential trade at index close options specifications 900 for both a mini-MSCI EAFE IC option 910 and a mini-MSCI Emerging Markets IC option 920 in accordance with some embodiments. Although the example of FIG. 9 is associated with a trade at index close, note that other types of reference benchmark values may be used instead.

For example, on Monday at 3:30 PM New York time, a basis buyer may buy, and a basis seller may sell, 141 EAFE IC calls at 106.32 (implying a basis of 6.32 and notional value of $316 per contract). The trade clears and settles at a premium of 6.32. The next day's official closing index level of 1,409,13 is available at 2:00 PM New York time on Tuesday. On Tuesday evening, the EAFE IC option settles to a value of 100 and is automatically exercised into 141 mini MSCI EAFE futures (MFS) at EDSP of 1,409.13.

As another example, on Monday at 1:30 PM New York time, a basis buyer sells, and a basis seller buys, 334 EM IC puts at 97.74 (implying a basis of −2.26 and notional value of −$203 per contract). The trade clears and settles at a premium of −2.26. The next day's official closing index level of 900.11 is available at 6:30 PM New York time on Tuesday. On Tuesday evening, the EM IC option settles to a value of 100 and is automatically exercised into 334 mini MSCI EM futures (MME) at EDSP of 900.11.

FIG. 10 illustrates a margin analysis 1000 for a trade at index close option according to some embodiments. The analysis 1000 compares an existing trade at index close process 1010 with a trade at index close options process with a positive basis 1020 and an option process with a negative basis 1030. In the example of FIG. 10, on day "T" it is agreed that a basis of +6.32 will be established for a trade against the next day's index close in EAFE. Moreover, on day T+1, the index closes at 1409.13 (implying a trade price of 1,415.45). As can be seen, the existing process 1010 is associated with a single transaction on day T+1 while the options processes 1020, 1030 both have transactions on days T and day T+1.

Figure 11:
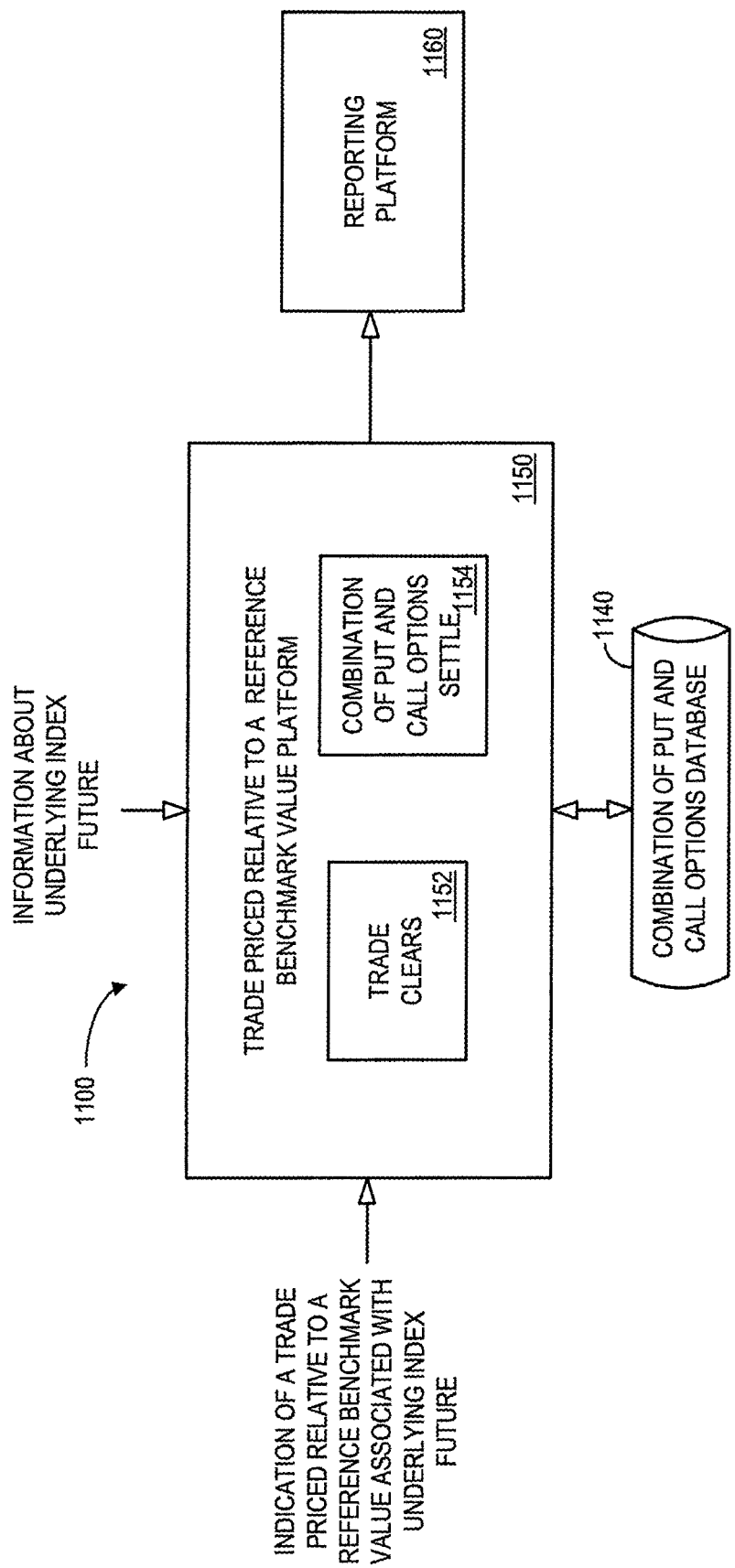
FIG. 11 is an example of a trades priced relative to a reference benchmark value combination of put and call options system in accordance with some embodiments.
Figure 12:
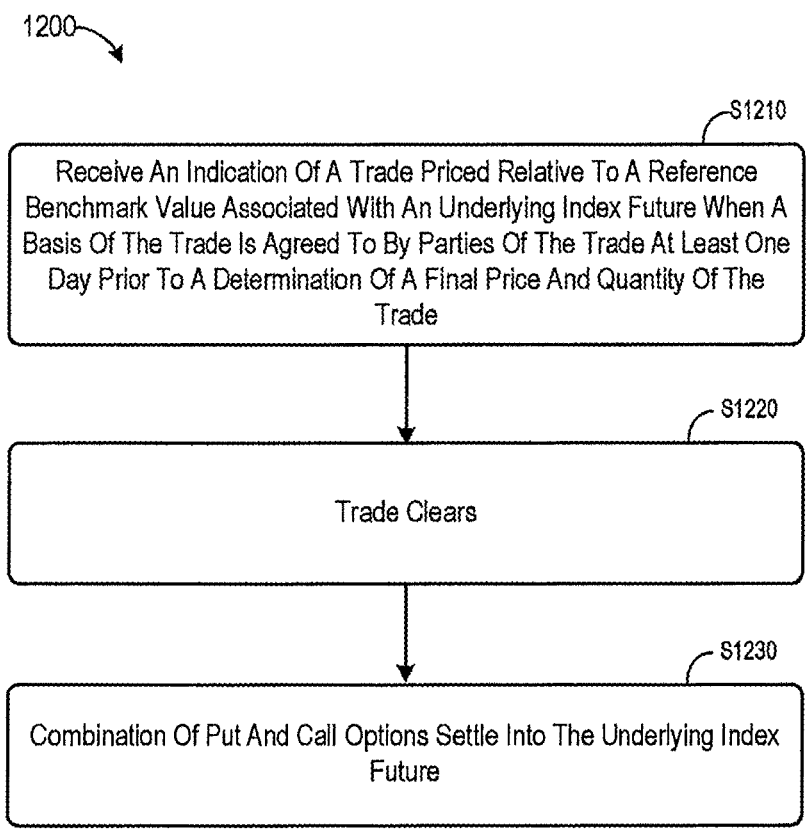
FIG. 12 is a diagram of a trades priced relative to a reference benchmark value combination of put and call options method according to some embodiments of the present disclosure.

FIGS. 7 through 10 describe the use of an option to facilitate trades priced relative to a reference benchmark value associated with an underlying index future. According to other embodiments, "puts" and "calls" may be used to facilitate trades priced relative to a reference benchmark value associated with an underlying index future. That is, a combination of put and call options-on-a-future may be utilized. FIG. 11 is an example of a trades priced relative to a reference benchmark value combination of put and call options system 1100 in accordance with some embodiments. As in FIG. 1, a trade priced relative to a reference benchmark value platform 1150 may receive an indication of a trade priced relative to a reference benchmark value associated with an underlying index future. According to this embodiment, after the trade clears 1152, the combination of put and call options settle 1154 and information about the trade may be stored in a combination of put and call options database 1140 and/or be transmitted to a reporting platform 1160. FIG. 12 is a diagram of a trades priced relative to a reference benchmark value combination of put and call options method 1200 according to some embodiments of the present disclosure. At S1210, an indication of a trade priced relative to a reference benchmark value associated with an underlying index future may be received when a basis of the transaction is agreed to by parties of the trade at least one day prior to a determination of a final price and quantity of the trade. At S1220, the trade may clear and the combination of put and call options may settle into the underlying index future at S1230. FIG. 13 is an example of a potential specification for a trade priced relative to a reference benchmark value options 1300 for both a mini-MSCI EAFE IC option 1310 and a mini-MSCI Emerging Markets IC option 1320 in accordance with some embodiments. Although the example of FIG. 13 is associated with a trade at index close, note that other types of reference benchmark values may be used instead.

For example, on Monday at 3:30 PM New York time, a buyer and a seller trade 141 EAFE IC futures option combos (long 1410 call and short 1410 put) at net cost of 6.32. The trade legs clear and settle at a net premium of 6.32. The next day's official closing index level of 1,409.13 is available at 2:00 PM New York time on Tuesday. On Tuesday evening, the call expires worthless and the short put is assigned 141 mini MSCI EAFE futures (WS) at EDSP of 1,409.13.

As another example, on Monday at 1:30 PM New York time, the buyer and seller trade 334 EM IC futures option combos (long 900 call and short 900 put) at −2.26. The trade clears and settles at a net premium credit of −2.26. The next day's official closing index level of 900.11 is available at 6:30 PM New York time on Tuesday. On Tuesday evening, the put expires worthless and the long call is automatically exercised into 334 mini MSCI EM futures ("MME") at EDSP of 900.11.

FIG. 14 illustrates a margin analysis 1400 for a trade at index close combination of put and call options according to some embodiments. The analysis 1400 compares an existing trade at index close process 1410 with a trade at index close combination of put and call options process 1420. In the example of FIG. 14, on day "T" it is agreed that a basis of +6.32 will be established for a trade against the next day's index close in EAFE. Moreover, on day T+1, the index closes at 1409.13 (implying a trade price of 1,415.45). As can be seen, the existing process 1410 is associated with a single transaction on day T+1 while the combination of put and call options process 1420, 1430 has trades on both days T and day T+1.

Figure 15:
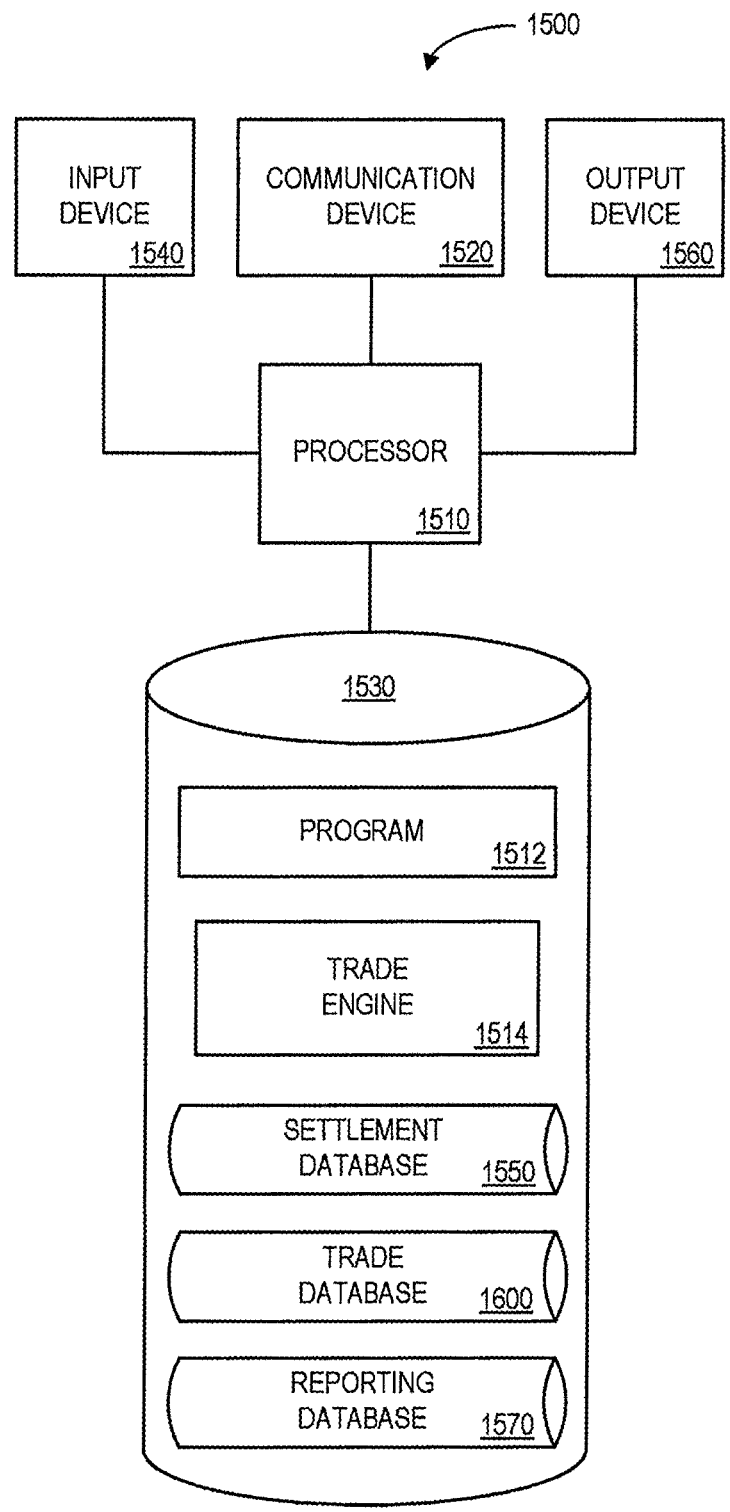
FIG. 15 is block diagram of a trade priced relative to a reference benchmark value platform according to some embodiments of the present disclosure.

The embodiments described herein may be implemented using any number of different hardware configurations. For example, FIG. 15 illustrates a trade priced relative to a reference benchmark value platform 1500 that may be, for example, associated with any of the embodiments described herein. The trade priced relative to a reference benchmark value platform 1500 comprises a processor 1510, such as one or more commercially available Central Processing Units (CPUs) in the form of one-chip microprocessors, coupled to a communication device 1520 configured to communicate via a communication network (not shown in FIG. 15). The communication device 1520 may be used to communicate, for example, with one or more remote devices or third-party data services. The trade priced relative to a reference benchmark value platform 1500 further includes an input device 1540 (e.g., a mouse and/or keyboard to enter trade information) and an output device 1550 (e.g., a computer monitor to display trade results and reports to an operator or administrator).

The processor 1510 also communicates with a storage device 1530. The storage device 1530 may comprise any appropriate information storage device, including combinations of magnetic storage devices (e.g., a hard disk drive), optical storage devices, mobile telephones, vehicle computers, and/or semiconductor memory devices. The storage device 1530 stores a program 1512 and/or a customer analytics tool 1514 (e.g., an interactive application) for controlling the processor 1510. The processor 1510 performs instructions of the programs 1512, 1514, and thereby operates in accordance with any of the embodiments described herein. For example, the processor 1510 may receive an indication of a trade priced relative to a reference benchmark value associated with an underlying index future when a basis of the transaction is agreed to by parties of the trade. Moreover, the indication may be received at least one day prior to a determination of a final price and quantity of the trade. The trade might create, according to some embodiments, other derivatives, such as a future, an option, or a combination of put and call options. The trade may be reported and cleared by the processor 1510, and it may then be arranged for the trade to physically settle into the underlying index future. According to some embodiments, the processor 1510 transmits an indication of the trade to an external platform (e.g., via communication port 1520).

The programs 1512, 1514 may be stored in a compressed, uncompiled and/or encrypted format. The programs 1512, 1514 may furthermore include other program elements, such as an operating system, a database management system, and/or device drivers used by the processor 1510 to interface with peripheral devices.

As used herein, information may be "received" by or "transmitted" to, for example: (i) the trade priced relative to a reference benchmark value platform 1500 from another device; or (ii) a software application or module within the trade priced relative to a reference benchmark value platform 1500 from another software application, module, or any other source.

In some embodiments (such as shown in FIG. 15), the storage device 1530 stores a settlement database 1550, a trade database 1600, and a reporting database 1560. An example of a database that may be used in connection with the trade priced relative to a reference benchmark value platform 1500 will now be described in detail with respect to FIG. 16. Note that the database described herein is only one example, and additional and/or different information may be stored therein. Moreover, various databases might be split or combined in accordance with any of the embodiments described herein.

Figure 16:
FIG. 16 is a tabular portion of a trade database according to some embodiments.

Referring to FIG. 16, a table is shown that represents the trade database 1600 that may be stored at the trade priced relative to a reference benchmark value platform 1500 according to some embodiments. The table may include, for example, entries identifying trades that have been processed, or are being processed, by the system. The table may also define fields 1602, 1604, 1606, 1608 for each of the entries. The fields 1602, 1604, 1606, 1608 may, according to some embodiments, specify: a trade identifier 1602, a description 1604, a date 1606, and related data 1608. The information in the trade database 1600 may be created and updated, for example, based on information received from external devices and/or administrators.

The trade identifier 1602 may be, for example, a unique alphanumeric code identifying a trade priced relative to a reference benchmark value platform. The description 1604 might indicate, for example, how a trade associated with an underlying index future is being handled (e.g., with a future, an option, or a combination of put and call options). The date 1606 might indicate when the trade was initiated, cleared, and/or settled. The related data 1608 might indicate whether the trade is pending or in process, financial values (e.g., an agreed basis, a final price, and a quantity), parties to the trade, etc.

The following illustrates various additional embodiments of the disclosure. These do not constitute a definition of all possible embodiments, and those skilled in the art will understand that the present disclosure is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present disclosure (e.g., some of the information associated with the databases described herein may be combined or stored in external systems).

Applicants have discovered that embodiments described herein may be particularly useful in connection with particular types of instrument exchanges. Further, note that MSCI is used herein only as an example, and embodiments may apply to automated reference benchmark value order types for any index. Note, moreover, that other types of interactions may also benefit from the disclosure. For example, embodiments of the present disclosure may be used in connection with other types of instrument exchanges.

The present disclosure has been described in terms of several embodiments solely for the purpose of illustration. Persons skilled in the art will recognize from this description that the disclosure is not limited to the embodiments described, but may be practiced with modifications and alterations limited only by the spirit and scope of the appended claims.

The invention claimed is:

1. A system comprising:
at least one database comprising one or more data tables; and
an electronic platform operatively coupled to the at least one database, the electronic platform comprising non-transitory memory and at least one processor configured to execute computer-readable instructions stored in the non-transitory memory, the electronic platform configured to:
store trade information associated with a trade as a record among the one or more data tables of the at least one database, the trade initiated in a first time zone and priced relative to a reference benchmark value associated with multiple time zones;
communicate with at least one external data source and receive components of the reference benchmark value associated with the multiple time zones from the at least one external data source, each of the components received at a specific time point associated with a respective one of the multiple time zones;
delay execution of the trade while the components of the reference benchmark value are received from the at least one external data source via an electronic network;
automatically determine the reference benchmark value based on all of said components of the reference benchmark value associated with the multiple time zones upon determining that a last of the components of the reference benchmark value is available;
retrieve the trade information associated with the trade from the record among the one or more data tables;
assign a final value of the trade to the retrieved trade information, based on the automatically determined reference benchmark value associated with the multiple time zones, and create an executable trade, the final value comprising a final price and a quantity;
automatically create, responsive to the executable trade, a derivative on an underlying index future priced according to at least one market in at least one of the multiple time zones;
report the executable trade to a reporting platform;
clear the trade; and
arrange for the trade to physically settle into the underlying index future.

2. The system of claim 1, wherein the reference benchmark value is associated with at least one of (i) an index close, (ii) an index open, (iii) an exchange daily settlement price, and (iv) a volume weighted average price over time.

3. The system of claim 1, wherein the specific time point, for each of the components, differs from a closing time of the first time zone.

4. The system of claim 1, wherein the electronic platform is configured to store the trade information responsive to receiving an indication of the trade.

5. The system of claim 4, wherein the last of the components of the reference benchmark value is received at a final specific time point that is an index close on a second day after a day that the indication of the trade is received.

6. The system of claim 1, wherein the electronic platform is further configured to:
generate a trade identifier and link the trade identifier with the trade, and
map the trade identifier and the trade information, in the record, to one or more predefined fields of the one or more data tables.

7. The system of claim 6, wherein the trade identifier and the trade information are stored in the record among the one or more data tables in a searchable format.

8. The system of claim 7, wherein retrieval of any portion of the trade information associated with the trade comprises searching for the trade identifier in a predefined field among the one or more predefined fields.

9. The system of claim 6, wherein the one or more predefined fields include one or more of a trade identifier field, a description field, a date field and a related data field.

10. The system of claim 9, wherein the related data field includes information comprising one or more of a processing status, one or more financial values and one or more trading parties.

11. The system of claim 1, wherein the at least one database is configured to update the one or more data tables based on information received from one or more entities.

12. The system of claim 1, wherein the derivative comprises one of (i) a future on the underlying index future, (ii) an option on the underlying index future, and (iii) a combination of put and call options on the underlying index future.

13. The system of claim 1, wherein the derivative created by the executable trade is listed on a central order book.

14. The system of claim 13, wherein the executable trade is available for block trading.

15. The system of claim 1, wherein
said report and said clear are associated with a mini-MSCI "EAFE" (Europe, Australasia and Far East) index trade at index close including at least one of a future, an option, or a combination of put and call options.

16. The system of claim 1, wherein
said report and said clear are associated with a mini-MSCI Emerging Markets index trade at index close including at least one of a future, an option, or a combination of put and call options.

* * * * *